(12) United States Patent
Michel et al.

(10) Patent No.: US 8,805,716 B2
(45) Date of Patent: Aug. 12, 2014

(54) DASHBOARD SYSTEM AND METHOD FOR IDENTIFYING AND MONITORING PROCESS ERRORS AND THROUGHPUT OF INTEGRATION SOFTWARE

(75) Inventors: Peter Michel, King Of Prussia, PA (US); Richard C. Nucci, Wynnewood, PA (US)

(73) Assignee: Dell Products, LP, Round Rock, TX (US)

( * ) Notice: Subject to any disclaimer, the term of this patent is extended or adjusted under 35 U.S.C. 154(b) by 180 days.

(21) Appl. No.: 13/423,749

(22) Filed: Mar. 19, 2012

(65) Prior Publication Data

US 2013/0246130 A1 Sep. 19, 2013

(51) Int. Cl.
*G06Q 10/06* (2012.01)

(52) U.S. Cl.
USPC .......................................................... 705/7.39

(58) Field of Classification Search
CPC ................................................ G06Q 10/06393
USPC ................................................ 705/7.39, 7.38
See application file for complete search history.

(56) References Cited

U.S. PATENT DOCUMENTS

| | | | |
|---|---|---|---|
| 5,299,304 A * | 3/1994 | Williams et al. .............. | 715/203 |
| 5,410,675 A | 4/1995 | Shreve et al. | |
| 5,794,246 A | 8/1998 | Sankaran et al. | |
| 5,917,730 A | 6/1999 | Rittie et al. | |
| 5,953,533 A | 9/1999 | Fink et al. | |
| 6,014,670 A | 1/2000 | Zamanian et al. | |
| 6,032,158 A | 2/2000 | Mukhopadhyay et al. | |
| 6,038,590 A | 3/2000 | Gish | |
| 6,044,374 A | 3/2000 | Nesamoney et al. | |
| 6,106,569 A | 8/2000 | Bohrer et al. | |
| 6,115,690 A | 9/2000 | Wong | |
| 6,134,706 A | 10/2000 | Carey et al. | |
| 6,208,990 B1 | 3/2001 | Suresh et al. | |
| 6,223,180 B1 | 4/2001 | Moore et al. | |
| 6,339,775 B1 | 1/2002 | Zamanian et al. | |
| 6,343,275 B1 | 1/2002 | Wong | |
| 6,418,400 B1 | 7/2002 | Webber | |

(Continued)

FOREIGN PATENT DOCUMENTS

WO WO 02/102097 A1 * 12/2002
WO WO 2008/134627 A2 11/2008

OTHER PUBLICATIONS

Boomi Integration Platform datasheet Boomi, Inc., 2006.*
Boomi On Demand product data sheet Boomi, Inc., 2007.*

(Continued)

*Primary Examiner* — Scott L Jarrett
(74) *Attorney, Agent, or Firm* — Larson Newman, LLP (57) ABSTRACT

An information handling system comprises a processor connected to a display and a storage device. The information handling system includes a connection via a network interface to a network that is adapted to receive data representing monitored business process data. Monitored business process data is received from the execution and operation of a customized executable system integration software application. The customized executable system integration software application represents one or more end-to-end integrated business processes of an enterprise or other user. The integrated business processes may operate at the network location of the enterprise or user or may be hosted at another network or in a cloud environment. The storage device is adapted to store the data representing the monitored business process data. The monitored business process data is aggregated from records for summary display via a hierarchical dashboard user interface.

20 Claims, 6 Drawing Sheets

(56) References Cited

U.S. PATENT DOCUMENTS

| | | | |
|---|---|---|---|
| 6,626,957 B1 | 9/2003 | Lippert et al. | |
| 6,640,226 B1 | 10/2003 | Shringeri et al. | |
| 6,725,231 B2* | 4/2004 | Hu et al. | 707/809 |
| 6,785,685 B2* | 8/2004 | Soetarman et al. | 1/1 |
| 6,789,096 B2 | 9/2004 | Sankaran et al. | |
| 6,820,077 B2 | 11/2004 | Godfredsen et al. | |
| 6,820,135 B1 | 11/2004 | Dingman et al. | |
| 6,823,373 B1 | 11/2004 | Pancha et al. | |
| 6,850,947 B1 | 2/2005 | Chung et al. | |
| 6,854,107 B2 | 2/2005 | Green et al. | |
| 6,895,409 B2 | 5/2005 | Uluakar et al. | |
| 6,895,471 B1 | 5/2005 | Tse et al. | |
| 6,907,306 B2* | 6/2005 | Hsieh et al. | 700/108 |
| 6,922,831 B1 | 7/2005 | Kroening et al. | |
| 6,988,165 B2 | 1/2006 | White et al. | |
| 6,993,743 B2 | 1/2006 | Crupi et al. | |
| 6,996,584 B2 | 2/2006 | White et al. | |
| 7,047,219 B1 | 5/2006 | Martin et al. | |
| 7,047,488 B2* | 5/2006 | Ingersoll et al. | 715/235 |
| 7,117,215 B1 | 10/2006 | Kanchwalla et al. | |
| 7,162,643 B1 | 1/2007 | Sankaran et al. | |
| 7,171,647 B1 | 1/2007 | Smith et al. | |
| 7,181,457 B2 | 2/2007 | Reinauer et al. | |
| 7,383,215 B1 | 6/2008 | Navarro et al. | |
| 7,496,888 B2 | 2/2009 | Sanjar et al. | |
| 7,499,951 B2* | 3/2009 | Mueller et al. | 715/762 |
| 7,584,192 B2* | 9/2009 | Rey et al. | 1/1 |
| 7,590,724 B1* | 9/2009 | Williams | 709/224 |
| 7,610,575 B2 | 10/2009 | Sproule | |
| 7,693,739 B2* | 4/2010 | Schmidtberg et al. | 705/7.38 |
| 7,698,634 B2* | 4/2010 | Bhatia et al. | 715/239 |
| 7,765,136 B2 | 7/2010 | Northington et al. | |
| 7,792,784 B2* | 9/2010 | Gupta | 707/602 |
| 7,941,784 B2 | 5/2011 | Shenfield et al. | |
| 8,010,845 B2* | 8/2011 | Rui et al. | 714/38.1 |
| 8,036,939 B2* | 10/2011 | Gil et al. | 705/22 |
| 8,060,396 B1* | 11/2011 | Bessler et al. | 705/7.23 |
| 8,095,416 B2* | 1/2012 | Harvey et al. | 705/7.39 |
| 8,126,762 B2* | 2/2012 | Ramachandran et al. | 705/7.28 |
| 8,165,993 B2* | 4/2012 | Broda et al. | 707/634 |
| 8,271,615 B2* | 9/2012 | Ellison et al. | 709/219 |
| 8,276,115 B2* | 9/2012 | Bates et al. | 717/106 |
| 8,315,939 B2 | 11/2012 | Blank | |
| 8,326,680 B2* | 12/2012 | Nguyen et al. | 705/7.41 |
| 8,595,047 B2* | 11/2013 | Bukovec | 705/7.26 |
| 2001/0052112 A1 | 12/2001 | Mohan et al. | |
| 2002/0016771 A1 | 2/2002 | Carothers et al. | |
| 2002/0073396 A1 | 6/2002 | Crupi et al. | |
| 2002/0095650 A1 | 7/2002 | Green et al. | |
| 2002/0104067 A1 | 8/2002 | Green et al. | |
| 2003/0221184 A1 | 11/2003 | Gunjal et al. | |
| 2003/0236677 A1* | 12/2003 | Casati et al. | 705/1 |
| 2004/0068431 A1* | 4/2004 | Smith et al. | 705/10 |
| 2004/0133876 A1 | 7/2004 | Sproule | |
| 2004/0236683 A1 | 11/2004 | Guermonprez et al. | |
| 2004/0243268 A1* | 12/2004 | Hsieh et al. | 700/108 |
| 2005/0005262 A1 | 1/2005 | Mohan et al. | |
| 2005/0198618 A1 | 9/2005 | Lalonde et al. | |
| 2005/0273758 A1 | 12/2005 | Long | |
| 2006/0017947 A1* | 1/2006 | Wang et al. | 358/1.13 |
| 2006/0143231 A1* | 6/2006 | Boccasam et al. | 707/104.1 |
| 2006/0161495 A1 | 7/2006 | Wigzell | |
| 2006/0184933 A1 | 8/2006 | Chessell et al. | |
| 2007/0150385 A1 | 6/2007 | Ode | |
| 2007/0168206 A1* | 7/2007 | McCall et al. | 705/1 |
| 2008/0163164 A1* | 7/2008 | Chowdhary et al. | 717/106 |
| 2008/0196006 A1* | 8/2008 | Bates et al. | 717/109 |
| 2008/0209078 A1* | 8/2008 | Bates et al. | 710/10 |
| 2008/0270977 A1* | 10/2008 | Nucci et al. | 717/105 |
| 2009/0006267 A1 | 1/2009 | Fergusson et al. | |
| 2009/0112666 A1* | 4/2009 | Guo et al. | 705/7 |
| 2010/0023362 A1* | 1/2010 | Nguyen et al. | 705/7 |
| 2010/0031140 A1* | 2/2010 | Cummins | 715/236 |
| 2010/0070981 A1* | 3/2010 | Hadar et al. | 719/318 |
| 2010/0306709 A1* | 12/2010 | Lynch et al. | 715/854 |
| 2011/0004627 A1 | 1/2011 | Reca et al. | |
| 2011/0218843 A1 | 9/2011 | Goel et al. | |
| 2011/0282715 A1* | 11/2011 | Nguyen et al. | 705/7.39 |
| 2012/0041945 A1* | 2/2012 | Blubaugh | 707/722 |
| 2012/0096279 A1 | 4/2012 | Roberts et al. | |

OTHER PUBLICATIONS

Boomi AS2 Transport datasheet Boomi, Inc., 2006.*
Boomi, Inc., Announces General Availability of the Boomi Integration Platform V3.0 PR Newswire, Jan. 16, 2004.*
Dell Agrees to Acquire Software Firm Boomi Wall Street Journal, Nov. 3, 2010.*
Sillk, Scott, Automating the Balanced Scorecard Management Accounting, vol. 79, No. 11, May 1998.*
Arnold, Tom, Dashboard & Scorecard Software Tools for Operations Management and Strategy Deployment Summit Media Partners, Sep. 18, 2002.*
Norton, David, SAP Strategic Enterprise Management: Translating Strategy Into Action: The Balanced Scorecard SAP, May 1999.*
TIBCO Staffware Process Suite product brochure TIBCO Software Inc., 2006.*
Chambers, Bill et al., Real-Time Data Access Using Business Process Management VARBusiness, vol. 19, No. 23, Nov. 10, 2003.*
Sturim, Robert, Achieving Competitive Advantage Through Supply Chain Integration Vitria Technology Inc., 1999.*
Intalio Adds Celequest BAM Technology to Its BPMS Solution; Celequest Process Management Dashboards Integrated into Intalio/BPMS, Business Wire, Jan. 17, 2006.*
Viaene, Stijn et al., Corporate Performance Management: Beyond Dashboards and Scorecards Journal of Performance Management, vol. 20, No. 1, 2007.*
Ergometrics.com web pages Ergometrics, Mar. 2000, Retrieved from Archive.org Jan. 25, 2007.*
iDashes.net web pages iDashes, Inc., May 2001, Retrieved from Archive.org Jan. 25, 2007.*
Performance Dashboards: Measuring, Monitoring, and Managing Your Business: Education and Research the Data Warehouse Institute, PowerPoint presentation, 2006.*
Exkerson, Wayne E., Performance Dashboards: Measuring, Monitoring, and Managing Your Business John Wiley & Sons, ISBN 13-978-0-471-72417-9, 2006.*
SAP Solution Managmer: Solution Monitoring—Active Global Support SAP, 2005.*
Using Business Activity Monitoring ES Dashboard, Adobe LiveCycle ES Version 8.0 Adobe, Jul. 2007.*
IBM FileNet P8, Version 5.0—Help web pages IBM, Nov. 2010.*
SAP Solution Manager 3.1: Strategic Background and Functional Overview SAP, 2003.*
"The Quest for a Cloud Integration Strategy," Boomi Whitepaper, 2011, http://marketing.boomi.com/QuestForCloudIntegration.html.
Oracle Internal Controls Manager 11i—Data Sheet, Oracle, Apr. 2003.
Few, Stephen, Intelligent Dashboard Design Perceptual Edge, Sep. 2005.
Resnick, Marc L., Building the Executive Dashboard, Proceedings of the Human Factors and Ergometrics Society, 47th Annual Meeting, 2003.
Evans, Owen B., Billing Score Card, University of Mississippi Medical Center, 2006.
The Financial Edge—Dashboard Guide, Blackbaud, Inc., 2011.
Bordeleau, David, Exploring Alternative Predictive Modeling Techniques to Strengthen the Customer Relationship, SAS SUGI31, Data Mining and Predictive Modeling, 2006.
Kareo.com Web pages—Dashboards, Kareo, Jan. 2010, Retrieved from Archive.org, Feb. 19, 2013.
Gonzalez, Tom, Designing Executive Dashboards—Part 1, BrightPoint Consulting, Inc., 2005.
Gonzalez, Tom, Designing Executive Dashboards—Part 2, BrightPoint Consulting, Inc., 2005.
Boomi AtomSphere, Boomi, Inc., 211 pages http://web.archive.org/web/20100429065017/http:/help.boomi.com/display/BOD/Boomi+AtomSphere+Helpboomi.com/display/BOD/Boomi+AtomSphere+Help.

(56) References Cited

OTHER PUBLICATIONS

Boomi AtomSphere, Boomi, Inc., 47 pages http://help.boomi.com/atomsphere/#GUID-B17ADCD8-8B85-4D68-A360-9552EAA22225.html.

Boomi AtomSphere web, Boomi, Inc., http://help.boomi.com/atomsphere/#GUID-B17ADCD8-8B85-4D68-A360-9552EAA22225.html.

Boomi AtomSphere Maps, Boomi, Inc., http://help.boomi.com/display/BOD/3.4+-+Building+Data+Maps.

Boomi AtomSphere API, Boomi, Inc., http://help.boomi.com/atomsphere/#GUID-C6847C47-5EFF-4933-ADA1-A47D032471C6.html.

Boomi AtomSphere Getting Started, Boomi, Inc., http://help.boomi.com/atomsphere/GUID-43F13F31-E82A-4AF8-BE49-9213D4715411.html#GUID-B522EE93-E8A2-43CC-9D3E-EF37371AEF32.html.

Boomi AtomSphere Core Terms, Boomi, Inc., http://help.boomi.com/atomsphere/GUID-CD1886F1-DCAC-41C1-A255-4287B78A2DE7.html.

Dell Boom AtomSphere Fall Release Harnesses Power of World's Largest Integration Cloud to Simplify Integration Complexity; http://www.boomi.com/news_and_events/press_releases/25102011.

Boomi AtomSphere Help, Boomi, Inc., Apr. 29, 2010 web.archive.org/web/20100429065017/http://help.boomi/display/BOD/Boomi+AtomSphere+Help.

Boomi AtomSphere Build, Boomi, Inc., Apr. 29, 2010 web.archive.org/web/20100429041219/http://help.boomi/display/BOD/3+-+Build.

Boomi AtomSphere Building Connectors, Boomi, Inc., May 10, 2010 web.archive.org/web/20100510115902/http://help.boomi/display/BOD/3.2+-+Building+Connectors.

Boomi AtomSphere Building Processes, Boomi, Inc., Dec. 12, 2009 web.archive.org/web/20091212010359/http://help.boomi/display/Bod/3.1+-+Building+Processes.

Boomi AtomSphere Manage, Boomi, Inc., Apr. 30, 2011 web.archive.org/web/20110430060121/http://help.boomi/display/BOD/5+-+Manage.

Boomi AtomSphere Monitoring Atoms, Boomi, Inc.,Noyember 9, 2010 web.archive.org/web/20101109011443/http://help.boomi/display/BOD/5.1+-+Monitoring+Atoms.

Boomi AtomSphere Executing a Process, Boomi, Inc., Nov. 9, 2010 web.archive.org/web/20101109025104/http://help.boomi/display/BOD/5.2+-+Executing+a+Process.

Boomi AtomSphere Viewing Process Executions, Boomi, Inc., Nov. 9, 2010 web.archive.org/web/20101109011449/http://help.boomi/display/BOD/5.3+-+Viewing+Process+Executions.

Boomi AtomSphere Atom Management, Boomi, Inc., May 19, 2011 web.archive.org/web/20110519171500/http://help.boomi/display/BOD/5.4+-+Atom+Management.

Boomi AtomSphere the Boomi Atom, Boomi, Inc., Jun. 13, 2010 web.archive.org/web/20100613115315/http://help.boomi/display/BOD/8+-+The+Boomi+Atom.

* cited by examiner

DASHBOARD SYSTEM AND METHOD FOR IDENTIFYING AND MONITORING PROCESS ERRORS AND THROUGHPUT OF INTEGRATION SOFTWARE

CROSS REFERENCE TO RELATED APPLICATIONS

Related subject matter is contained in co-pending U.S. patent application Ser. No. 12/110,607 entitled "System and Method For Automated On-Demand Creation of a Customized Software Application," filed on Apr. 28, 2008, the disclosure of which is hereby incorporated by reference.

Related subject matter is also contained in co-pending U.S. patent application Ser. No. 13/333,517 entitled "System to Automate Development of System Integration Application Programs and Method Therefor," filed on Dec. 21, 2011, the disclosure of which is hereby incorporated by reference.

FIELD OF THE DISCLOSURE

This disclosure generally relates to information handling systems, and more particularly relates to monitoring business processes with a dashboard.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, procurement, stocking and delivery tracking, provision of data services and software, airline reservations, enterprise data storage, or global communications. In addition, information handling systems may include a variety of hardware and software components that may be configured to process, store, and communicate information and may include one or more computer systems, data storage systems, and networking systems. Today, most business enterprises have sophisticated computing systems that are used both for internal operations, and for communicating outside the enterprise's network.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Today, most businesses and other enterprises have sophisticated computing systems that are used for facilitating internal operations and for communicating outside the enterprise's network, for example to exchange information with business partners. Much of present day information exchange is conducted electronically, via communications networks, both internally to the enterprise, and among enterprises. Accordingly, it is often desirable or necessary to exchange information or data between distinctly different computing systems, computer networks, software applications, etc. The enabling of communications between diverse systems or networks or applications in connection with the conducting of business processes is often referred to as business process integration.

Relatively recently, systems have been established to enable exchange of data via the Internet, such as via web-based interfaces for business-to-business and business-to-consumer transactions. For example, a buyer may operate a personal computer (PC) to connect to a seller's website to manually enter data using a web interface provided by the seller's computing system. In higher volume environments, a buyer may use an executable software application known as Electronic Data Interchange (EDI) Software, or Business-to-Business Integration Software to connect to the seller's computing system and to deliver electronically a business document, such as a purchase order, without requiring human intervention to manually enter the data. These applications are typically purchased from software vendors and installed on a computerized system owned and maintained by the business, in this example the buyer. The seller will have a similar or complementary software application on its system, so that the information exchange may be completely automated in both directions. In contrast to the system presently disclosed, these applications are purchased, installed and operated on the user's local system. Thus, the user typically owns and maintains its own copy of the system, and configures the application locally to connect with its trading partners.

In both the traditional and more recent approaches, the executable software application is universal or generic as to all trading partners before it is received and installed within a specific enterprise's computing network. In other words, it is delivered to different users or systems in an identical, generic form. The software application is then installed within a specific enterprise's computing network, which may include data centers, etc. located outside the physical boundaries of the enterprise. After the generic application is installed, it is then configured and customized for a specific trading partner. The customized application can be executed to exchange data between the specific trading partner and the enterprise. For example, Wal-Mart may provide on its website specifications of how electronic data such as Purchase Orders and Invoices must be formatted for electronic data communication with Wal-Mart, and how that data should be communicated with Wal-Mart. A supplier or enterprise is then responsible for finding a generic, commercially-available software product that will comply with these communication requirements and configuring it appropriately. Accordingly, the software application will not be customized for any specific supplier until after that supplier downloads the software application to its computing network and configures the software application for the specific supplier's computing network, etc. Alternatively, the supplier may engage computer programmers to create a customized software application to meet these requirements, which is often exceptionally time-consuming and expensive.

U.S. patent application Ser. No. 12/110,607 shows a system and method for automated development of customized executable system integration software applications. For example, an enterprise can define an integration system via a modeling process to enable bi-directional exchange of data between internal applications, between internal applications and external trading partners, or between internal applications and applications running external to the enterprise. Applications running external to the enterprise are commonly referred to as Software as a Service (SaaS). Integration software can assist defining the business process to be integrated by a user. Each integrated business process represents a complete end-to-end interface. For example, a process could be customized to accept a purchase order (PO) from a retailer such as Wal-Mart, transform the PO into a format recognizable by a certain internal order management software application of the enterprise, and then insert the contents of that PO directly into the enterprise's order management system. The customized executable system integration software application that results provides the desired interoperability as defined by the party using the integration software application code.

The present disclosure facilitates communication between different software applications or systems within a single computing network, such as between an enterprise's information warehouse management system and the same enterprise's purchase order processing system. It also facilitates communication between different software applications or systems within different computing networks, such as between a buyer's purchase order processing system and a seller's invoicing system. Upon integration of the business processes, it is helpful to users to be able to monitor various metrics relating to the integrated processes. For example, the monitored information may be used for diagnostic purposes and planning purposes. The data gathered while monitoring the execution of an integrated business process event may be stored as a business process execution record for that event. The types of data gathered and the historical record of that gathered data may be referred to as monitored business process data. In particular, when multiple integrations are simultaneously operating, this monitoring and gathering of monitored business process data may be very valuable to the users of the integrated business processes. Thus, the present disclosure monitors integrated business processes and provides useful and versatile access to the gathered monitored business process data.

Figure 1:
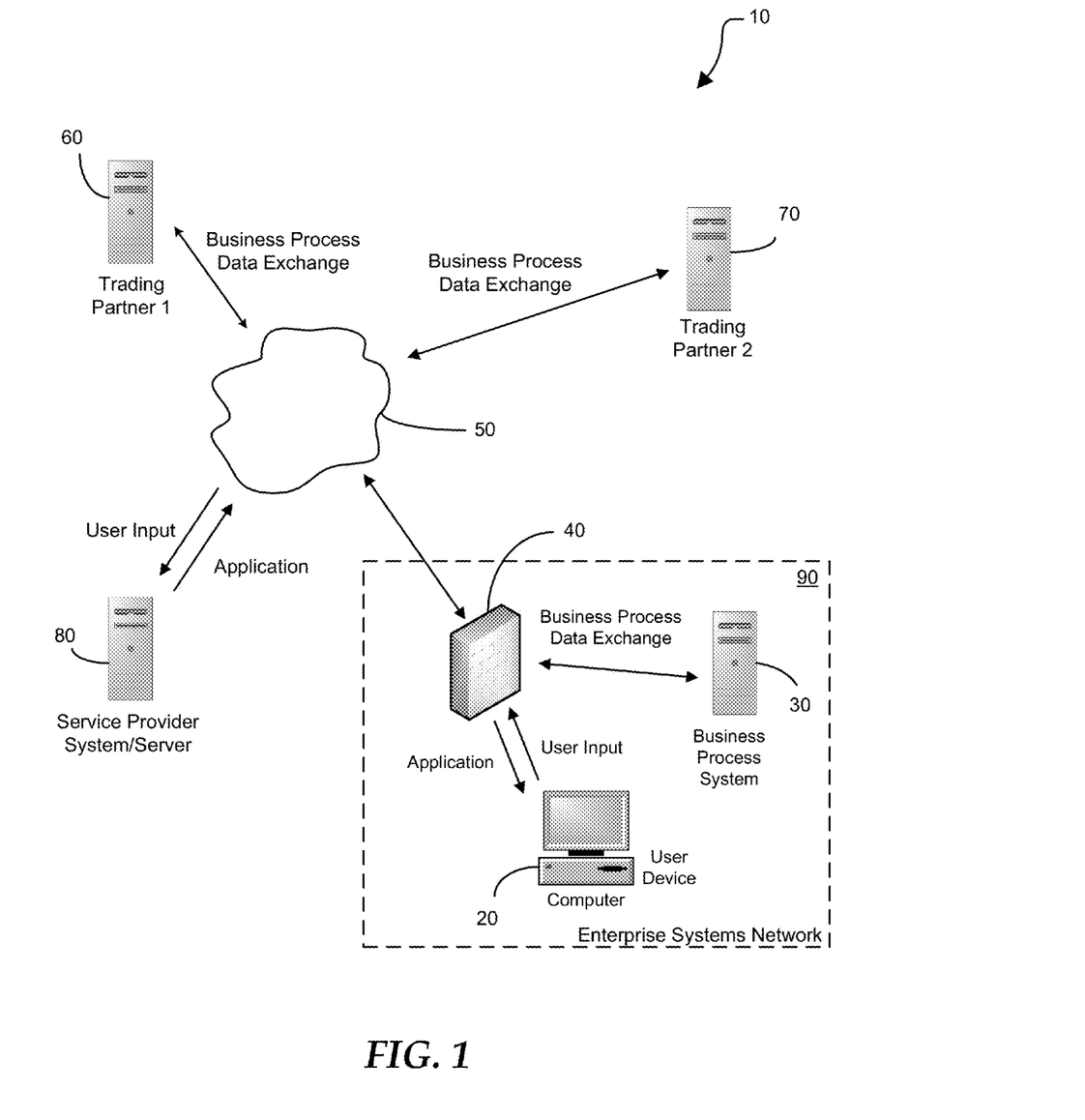
FIG. 1 is a block diagram illustrating a distributed business network system according to an embodiment of the present disclosure.

FIG. 1 shows a distributed business network system 10 including conventional information handling systems of a type typically found in client or server computing environments. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

More specifically, the system 10 includes a conventional user or client device 20, such as a personal computer, enabling a user to communicate via a communications network 50, such as the Internet. The exemplary user device 20 may be configured with conventional web browser software. The web browser, such as Microsoft Corporation's Internet Explorer web browser software, allows the user to interact with websites via the network 50. The client device 20 is positioned within an enterprise network 90 behind an enterprise network's firewall 40. For illustrative purposes, the enterprise network 90 includes a business process system 30, which may include conventional computer hardware and commercially available Enterprise Resource Planning (ERP) and other business process software such as QuickBooks, SAP's MySAP ERP, Oracle's OneWorld, JD Edwards' ERP, Infor's WMS application, and the like. The system 10 further includes trading partner systems 60 and 70 for receiving and/or transmitting data relating to business-to-business transactions. For example, Wal-Mart may operate trading partner system 60 to allow for issuance of purchase orders to suppliers and to receive invoices from suppliers in electronic data form as part of electronic data exchange processes.

The system and methods disclosed herein allow a service provider, an enterprise, or even a trading partner to monitor the execution of an integrated business process event conducting the exchange of electronic data between an enterprise's integrated internal applications. Alternatively, the systems and methods disclosed allow a service provider, an enterprise, or even a trading partner to monitor the execution of an integrated business process event conducting the exchange of electronic data with one or more trading partners or applications available via the Internet, commonly referred to as Software as a Service.

FIGS. 1-6 illustrate a system and method for monitoring business processes running one or more customized executable system integration software applications via a hierarchical dashboard. The business process integration for each customized executable system integration software application may be automatically developed on-demand and real-time for an enterprise by a service provider system or server within the network 10 depicted in FIG. 1. The customized executable system integration software applications run one or more business integration processes. Each may integrate one or more internal enterprise applications, one or more types of external applications (for example, those of a trading partner), or some combination of both. The execution of the code for the customized executable system integration software application that integrates the exchange of electronic data is referred to as a business process event. An integrated business process event may exchange any amount of data or any number of documents. The operation of the customized executable system integration software application during an integrated business process event may be monitored in its entirety or in a subset of parts. The monitoring may be customized for various purposes such as to conduct testing, to assess health or status of the integrated business process elements, or to assess usage of the integrated business processes. The monitored business process data may be reported from the location operating the runtime engine that runs the customized executable system integration software application. This location may be a hosted runtime engine, a local runtime engine, or some networked combination of either or both. The monitored business process data is reported back to a service provider system or server 80 or may be reported within the enterprise system or network 90.

The customized executable system integration software application may be packaged within a container program, also referred to herein as a dynamic runtime engine. An example runtime engine that may package the customized executable system integration software application is a JAVA runtime engine. The dynamic runtime engine may be an executable software application capable of running on a computer within the enterprise's network, which may include, for example, networks owned and/or operated by third party data center providers, such as OpSource, Amazon, etc. Alternatively, the runtime engine may be distributed and operated on one or more hosted information handling systems accessible by a customer or user. As changes are made to the model underlying the customized executable system integration software application, the executable software application can automatically check for and apply these changes as needed without requiring human intervention.

Each business process utilizing a customized executable system integration software application is associated with its respective users and/or trading partners. This is the account information for that particular customized executable system integration software application deployment. A service provider or user may choose to group data received via the monitoring system to present a broader view of the function of customized executable system integration software applications across a broader perspective, for example multiple deployments at a given location or multiple deployments within a given user account. A user account may also have associated sub-accounts or other related accounts. Monitored business process data may be filtered by sub-account or expanded to include related accounts if security permissions are available to the viewer of the dashboard information.

Figure 2:
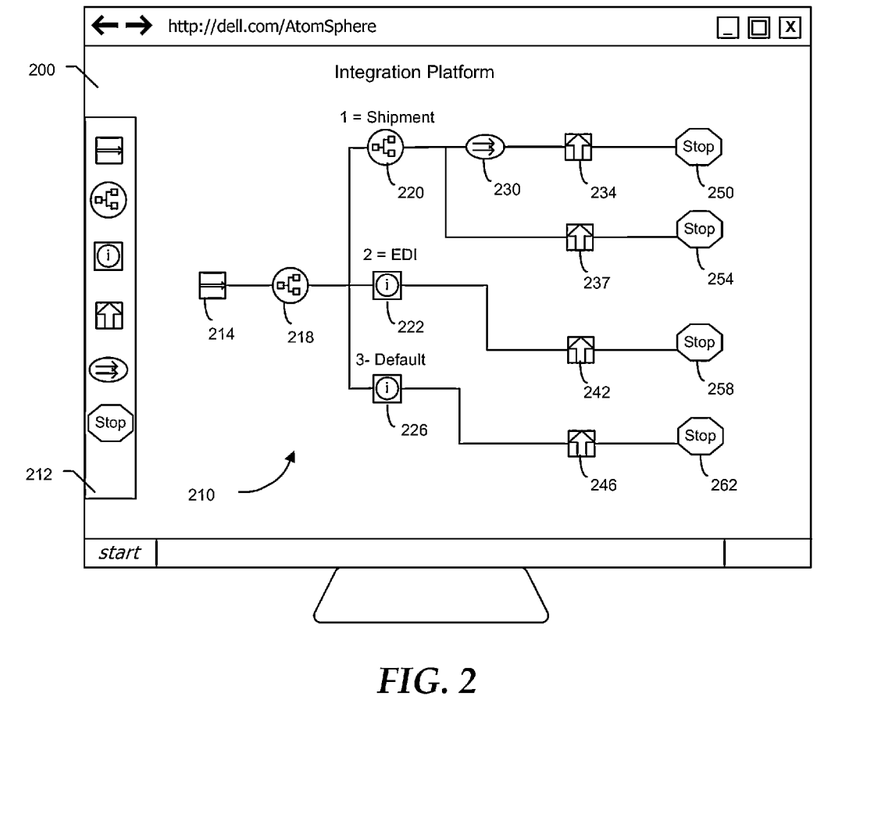
FIG. 2 illustrates a visual model of an example business process according to an embodiment of the present disclosure.

The user may create a model business process or processes to be executed by the customized executable system integration software application via a graphical editor. The exemplary flow diagram of FIG. 2 shows such a modeled business process and includes an Inbound connector element 214, Routing process elements 218 and 220, Document Property elements 222 and 226, Data Transformation process element 230, Outbound connector elements 234, 238, 242, and 246, and Process End elements 250, 254, 258 and 262. Since the elements may require data input from a user, the resulting codesets that make up the customized executable system integration software application contain information about each element. For example, the inbound connector element 214 may be configured for a specific enterprise and process with data input via dialog boxes or selecting menu items, etc. as appropriate. For example, data entry element 214 may be configured such that the input data will be inbound from an SAP system. The element, in combination with data related to that portion of the business process is associated with a specific Connector code set stored in the memory of the system 80. Each Connector is comprised of a modular codeset that is customized for communicating with the specific software application or system. The customized codeset therefore provides connectivity for specific software applications, databases, and/or systems. The outbound connector elements may be similarly configured. For example, the last step of the integrated business process may involve sending shipping order data to Company X system. The Shipping Order will be prepared as an XML message, which is a readily recognizable format. The XML message is then sent to the outbound connector, and the outbound connector converts the XML message from this simple, recognizable format into the proprietary format that is understood by the SAP system. The input and output data formats for the conversion are associated with the modular codeset selected and customized for the outbound connector element. Additionally, the routing element may require custom data associated with it for proper application of the routing logic; the Document Properties element may require input for file naming, file storage location, etc. to be applied. There may be other elements that result in codesets for the customized executable system integration software application as customized by the user and generated by the service provider.

Each branch of the flow diagram represents an end-to-end business process to be integrated. In the example of FIG. 2, the first (top-most) branch may model a process involving receipt of data from an SAP system in a corresponding format, routing the data according to prescribed logic (for example, 1=shipment), further routing according to further logic, transforming the data from the SAP system format to the destination system format by Data Transformation process element 230 to create an appropriately formatted XML document, and then transmitting the transformed data to the destination system in accordance with the properties and attributes of the outbound application connector 234. Examples of other common activities include synchronizing customer data between applications, synchronizing product information between applications, notification of receipt of goods ordered by a retailer, receipt of a work related injury claim, and many others. The model business process or processes are automatically assembled into customized executable codesets that form the customized executable system integration software applications. As explained elsewhere, these customized executable system integration software applications may be run at an enterprise network location or hosted in a cloud computing environment such as one hosted by the service provider.

The execution of the integrated business processes may be monitored by the customized executable system integration software applications themselves. In an example embodiment, this monitored business process data may be ultimately collected by the service provider system or server. Data is gathered for several operational metrics and reported to the service provider database. Reporting of the operational metrics of the customized executable system integration software application alternatively may be monitored by and reported to a database maintained at the user's enterprise hardware in the Enterprise Systems Network 90. In yet another alternative embodiment, operational metrics for the customized executable system integration software application may be monitored by and reported to systems or servers and database locations of individual trading partners 60 and 70. During operation of the customized executable system integration software applications that integrate diverse user applications and business processes, several types of operational metrics and identifying information are gathered and reported. This monitored business process data creates a process execution record. The category of data that may be monitored in a process execution record is the monitored business process data for customized executable codesets that form the customized executable system integration software applications. In other words, the monitored business process data is the data that is kept for each execution of an integrated business process and the aggregated data that is stored for each executable system integration software application deployed for a user.

The customized executable system integration software applications gather and store monitored business process data including, for example: the business process name; the unique identifier of each business process (business process ID); the unique identifier of each business process execution (execution ID); the account identification of the enterprise user of the integration application (account ID); and the identification and name of the enterprise location running the business process integration (atom ID and Name). Other identification data may also be monitored and stored such as relatedness data of accounts and connector usage, type, and number deployed. These various types of identification information may be made part of the business process execution record.

The customized executable system integration software application elements measure and store monitored business process data including, for example: the business process integration start time; the business process integration running time; data input levels; data output levels; input document counts; output document counts; throughput levels; execution counts; and overall process errors. Several other factors identifying business processes or measuring usage and activity of the customized executable system integration software applications may also be gathered or measured as monitored data. These various types of metrics may also be made part of the business process execution record. Table 1 shows example types of monitored business process data fields that may be included in the business process execution record.

TABLE 1

| FIELD | DESCRIPTION |
| --- | --- |
| Execution ID | Unique identifier assigned to an execution |
| Account ID | Unique identifier assigned to a user or enterprise |
| Atom ID and Name | Name and number ID assigned to the business process at a location |

TABLE 1-continued

| FIELD | DESCRIPTION |
| --- | --- |
| Atom Local ID | ID number of the local location within the cloud hosting the business process |
| Date Group | The day the process ran |
| Deployment ID | A unique identifier pointing to a version of the process |
| Elapsed Time | Duration of time it took to run the process |
| Error | A brief error message, if applicable |
| Error Count | The number of documents that had errors |
| Execution Mode | Whether a manual execution, or a scheduled one, etc |
| Connector Usage | Connector types deployed, names, and the number of connectors |
| Inbound Document Count and Size | The number of documents received inbound and their size |
| Outbound Document Count and Size | The number of documents outbound and their size |
| Throughput | (Inbound Document Size + Outbound Document Size)/2 |
| Process ID and Name | Name and unique identifier of a business process |
| Original Execution ID | Applicable if this execution was a retry of a previous execution; unique identifier of the previous execution |
| Retry Flag and Count | Status as a retry and how many |
| Start Step Information | ID, action, name, type, etc. |
| Status | Success, error, or pending |
| Top Level Process ID | If this is a sub process, ID number of the top process |

The business process execution record should at least include the following monitored business process data: the process ID or name, the execution ID, the account ID, and at least one measured data metric.

The monitored business process data may be reported back to a common location such as a service provider hosted application or website. In the specific embodiment discussed, the process execution record is stored locally until the business process execution is complete. Upon completion, the process execution record is reported back to a service provider database in the present embodiment.

First, data may be taken or reported from individual runtime engines managing specific integrations. Second, data may be taken or reported from multiple customized executable system integration software applications for purposes of comparison or overall performance assessment. Thus, the potential scope of reported data may be vast. With a potentially vast amount of performance data being monitored, this information should be available and useable to both a service provider and or a user of the customized executable system integration software application or applications. A hierarchical dashboard provides a useful consolidation of executable system integration software application performance data for analysis by an enterprise or user as well as a provider of business process integration capabilities.

Monitored business process data may be presented in a graphical user interface. The graphical user interface may be in the form of a hierarchical dashboard similar to that shown in FIG. 3. The hierarchical dashboard permits presentation from multiple business process integrations at a centralized network-accessible server or system. Data from the multiple business processes may be combined for side-by-side comparison. Monitored business process data from multiple business processes may also be grouped or restricted for security or analysis purposes. For example, data may be restricted to limit access to data from specific trading partners. Monitored business process data available on the hierarchical dashboard may be utilized by the service provider, or may also be shared with the enterprise or even the trading partners for various purposes.

Figure 3:
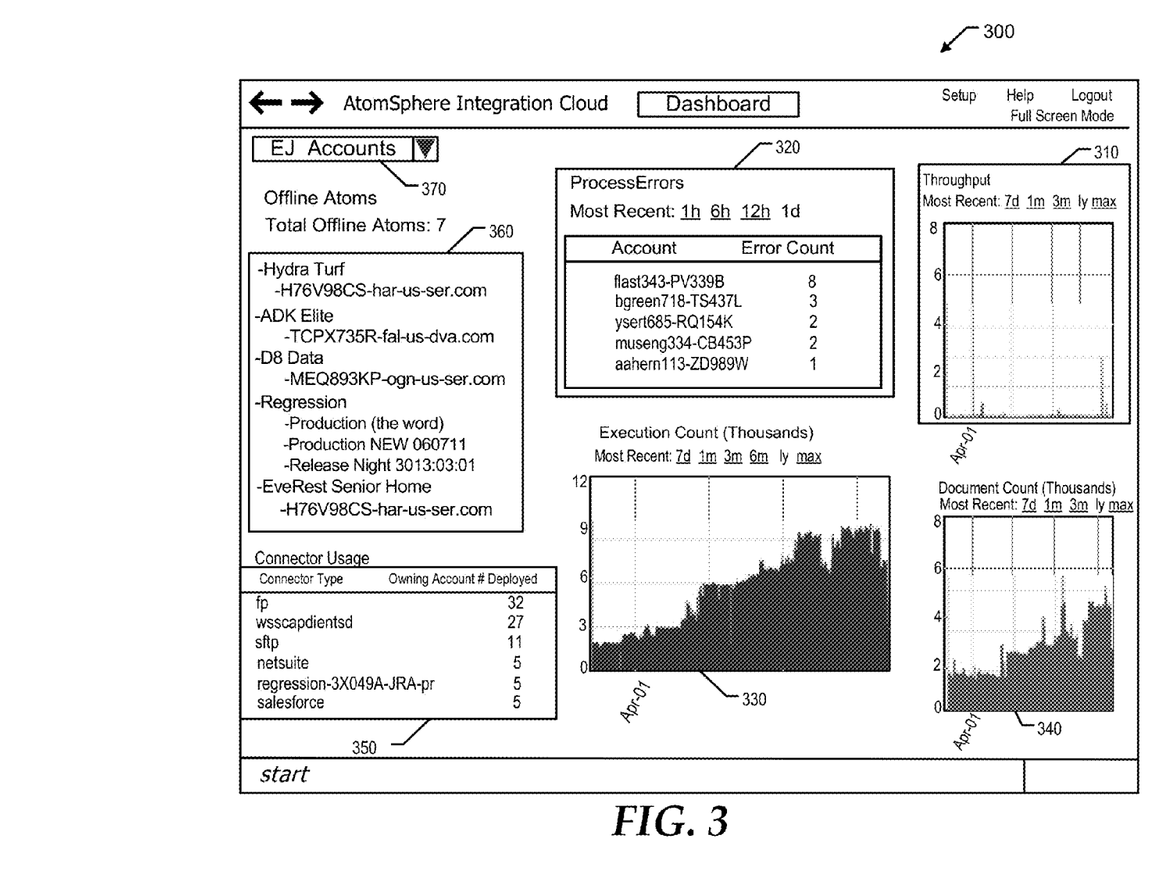
FIG. 3 illustrates a hierarchical dashboard presenting monitored business process data from more than one integrated business process event according to an embodiment of the present disclosure.

For example, if a service provider wishes to see the monitored operation of the business process integrations for one or more users of its services, then this monitored business process data may be retrieved. The user may include multiple sub-users each with several trading partners. Monitored business process data may be collected according to a user's account, or the specific business process deployments of individual sub-users. That data may then be displayed in a hierarchical dashboard as shown in FIG. 3. A filter 370 may be applied to display the correct scope of the data within the hierarchical dashboard. In an example embodiment, monitored business process data may be viewed on the hierarchical dashboard relating to one or more trading partners. The trading partners may be grouped in many different ways, such as with vendors in one group, service providers in another group, and customers in yet another group. The operation of the customized executable system integration software applications customized for these groups of trading partners may be monitored separately or together.

A given user or customer may operate multiple customized executable system integration software applications on one or more runtime engines to achieve its business process integration goals. These business process integration goals may also involve integration of one or more applications internally. The user's business process integration goals may also involve integration of one or more applications of multiple trading partners. The present disclosure also contemplates integration of both internal and trading partner applications.

The present disclosure provides the service provider, enterprise or trading partner with a platform for monitoring the integrated business process or processes. It efficiently permits the service provider or enterprise to monitor important business process metrics and identifying information of the whole or any subset of customized integrated business processes via a hierarchical dashboard. The disclosed system and method gives the user of the hierarchical dashboard easy access to the varied, real-time and historical performance information of the integrated business processes and the customized executable system integration software application. The information measured and the information accessible is adaptable in the dashboard depending on the business integration monitoring goals of the user. In other words, the hierarchical dashboard allows the user to selectively view the monitored business process data and even to select which data may be monitored. For example, the view of monitored business process data may be customized for assessment of the health of the operation of the customized executable system integration software application, for testing of new models of business process integration, for security purposes, for analysis of usage by trading partners, or for other reasons.

In accordance with the present disclosure, a provider of a service (service provider) for creating on-demand, real-time creation of customized executable system integration software applications operates a service provider server/system 80 within the network 10. The system 80 may be specially configured in accordance with the present disclosure, and may be capable of communicating with devices in the enterprise's network 90. Monitored business process data on the operation of the customized executable system integration software applications may be reported from the enterprise network 90 to the service provider server/system 80. It should be noted that the communication between system 80 and network 90 is essentially unidirectional in that communications and communication sessions originate from network 90 to system 80, and not from system 80 to network 90. Accordingly, the network 90 need not have its firewall 40 modified to allow incoming traffic from communications sessions originating from system 80. This would not necessarily be the case for embodiments wherein the hierarchical dashboard utilized by the service provider was also provided to the enterprise network 90.

The hierarchical dashboard system may be configured in accordance with the present disclosure to provide web server functionality for presenting a user-accessible website. Communications between the user device 20 and the system 80 website may be performed using conventional communications technologies, such as the HTTPS protocol. The website may be specially configured to provide a graphical user interface on service provider server/system 80 (display not shown) providing a service provider the hierarchical dashboard permitting a user to monitor measured data, real-time or historical, relating to the process flows between applications or systems. These measurements may be reported from business process flows using the customized executable system integration software application, for example between trading partner and enterprise systems. The graphical user interface dashboard in the presently described embodiment is used by the service provider, but may be used by different enterprises or customers of the service provider, or even trading partners. The interface provides a graphical representation of monitored business process data measured from the customized executable system integration software application and reported to the service provider system or server 80. The dashboard user interface may be set up according to accounts which establish and have saved the profile of information monitored and accessible via the dashboard. The type of information visually available is adjustable both via the profile and may be modified on the dashboard. The user may select filters or specifications indicating what data to view. That filter may be to limit the data by trading partner, by group of trading partners, type of business process integrated, by subset of business processes, or by individual business process. Data viewing specifications may be adjusted according to timespan or type of connector used within an integration. The visual elements of the dashboard may include graphical representation of metrics monitored, chart type visual data display, tree-type representations of data and related subcategories of data, drop-down or other user selectable menus for selecting access variables, or links to application-specific connectors or additional specific monitored data. For example, the graphical user interface may provide drop down or other user-selectable menu options for identifying trading partners, application connectors and process attributes or parameters or settings, etc. The dashboard may also reflect textual descriptions that may describe the particular data set being monitored. In the current embodiment, information and computer executable instructions for presenting such a graphical user interface dashboard are stored in a memory of the service provider server/system 80.

By way of illustration, FIG. 3 shows an example dashboard graphical user interface 300 of an integration platform displayed within a web browser window. The graphical user interface 300 displays exemplary business process integration monitoring data in the form of summary tables and charts. In this example, the website graphical user interface allows the user to monitor data such as throughput 310, process error counts 320, execution counts 330, document counts 340, connector usage 350, or online or offline status 360 of information handling systems running customized executable system integration software applications. This data reflects business process information relating to trading partners, activities, enterprise applications, function of enterprise system attributes, and/or process attributes that are unique to the end-to-end business integration process of a specific enterprise. The data reflects the units of work conducted by the system as part of the integration process. For example, the integrated business process transforms data from one format to another, routes data down multiple paths of execution by examining the contents of the data, and business logic may validate the data being processed.

Figure 4:
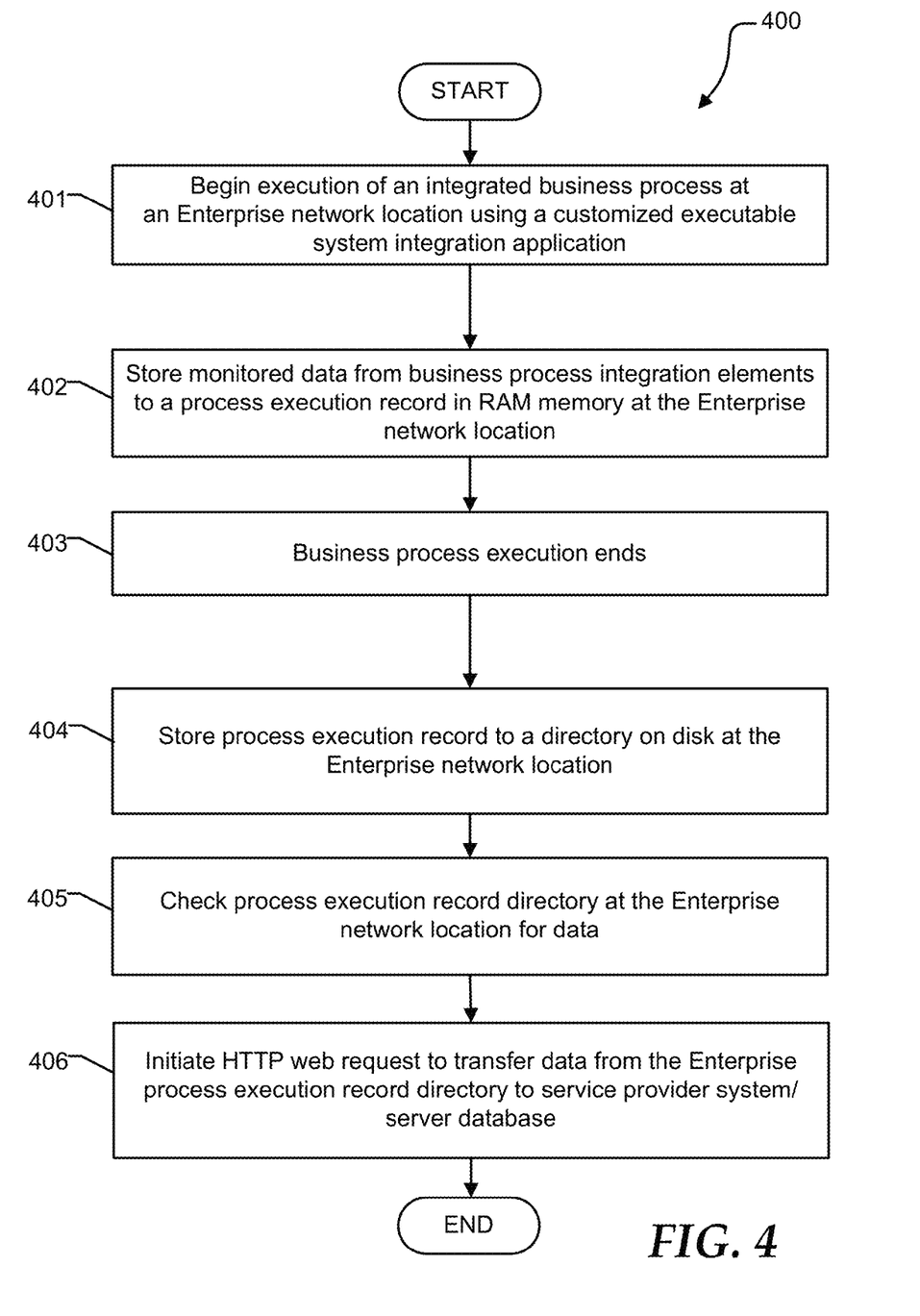
FIG. 4 is a flow diagram illustrating a method according to an embodiment of the present disclosure.

Data is provided from one or more of the elements that constitute the exemplary business process flow diagram shown in FIG. 2. FIG. 4 shows a method 400 in accordance with an embodiment of the present disclosure for gathering business process execution data. The method 400 shows an embodiment for measuring and collecting data from the elements of a customized executable system integration software application. This exemplary method creates a process execution record directory at the location running the integrated business process. The flow begins at block 401 where the execution of an integrated business process event triggers the customized executable system integration software application to run. In a preferred embodiment, each integrated business process event run on the customized executable system integration software application is assigned a unique identification number or code. In addition, each customized executable system integration software application deployed has a unique identification number or code.

The flow proceeds to block 402 where the elements record data to a process execution record in RAM memory of the information handling system executing the application. Monitored business process data may be received from any of the customized codesets represented by Inbound connector elements 214, outbound connector elements 234, 238, 242, and 246, and the other elements in the example end-to-end integration model shown in FIG. 2. Still other monitored business process data may be received more generally from the customized executable system integration software application though not from any specific element. For example, many fields of process identification data may be generally recorded from the customized execution integration application. This monitored business process data is stored in RAM during the execution of the integrated business process. The monitored business process data stored in RAM becomes the business process execution record.

By way of exemplary embodiment, monitored business process data measured and recorded from an Inbound connector element 214 is specifically described. An Inbound connector element 214 may continuously report its status, for example active or inactive, during operation of the business process integration. The customized code executing the functions of the Inbound connector element 214 may also count and report the number of inbound documents handled by this element. The inbound document count is reported for the given period of time that the Inbound connector element 214 is running that particular business process execution event. The Inbound connector element code may also collect and report data reflecting errors in processing that occur. Finally, the Inbound connector element code may contribute to data collected and reported relating to the amount of data that passes through it. This data reflects some part of the amount of data (in bytes) that passes through the entire customized executable system integration software application. The above is just an example of data collected from an Inbound connector. Similar or analogous data may be collected from other elements including Outbound connector elements. For example, an Outbound connector element may also report status, outbound document counts, and outbound data volumes.

In addition to collecting data specific to business process elements, the monitoring system and database may also request overall data relating to the operation of the customized executable system integration software application. For example, each customized executable system integration software application may collect information indicating how many connectors are deployed, start time of the business process execution event, duration of the business process execution event, location identification of the business process execution, account identification for the user of the business process information, how many documents are processed or modified for integration purposes, how much data passes through the integration, and how many errors occur. Further example data fields are shown above in table 1. When data from all elements and the overall customized executable system integration software application has been assembled, a business process execution record is created for the execution of a given integrated business process event.

The flow proceeds to block 403 where the execution of the integrated business process event ends and the duration of the execution is recorded. Proceeding to block 404 upon termination of the business process event, the process execution record is transferred to a process execution record directory on disk at the location where the business process is executed.

The flow proceeds to block 405, the customized executable system integration software application runs a periodic thread to check the process execution record directory on disk for records stored there. At block 406, if records are found in the process execution record directory, the information handling system running the customized executable system integration software application initiates transfer of that data. The information handling system in the presently described embodiment is located in the enterprise network 90. In one particular embodiment, the information handling system initiates an HTTP or other network protocol based web request to transfer the data in the process execution record directory to a located in the Service Provider's network 80. Alternatively, a monitoring database could be maintained within the enterprise network 90 or hosted externally. Data is reported back to the monitoring database via well-known networked communication channels using standard communication protocols. Secured communications are preferable, and therefore encryption techniques may be employed to communicate the process execution record directory data.

Figure 5:
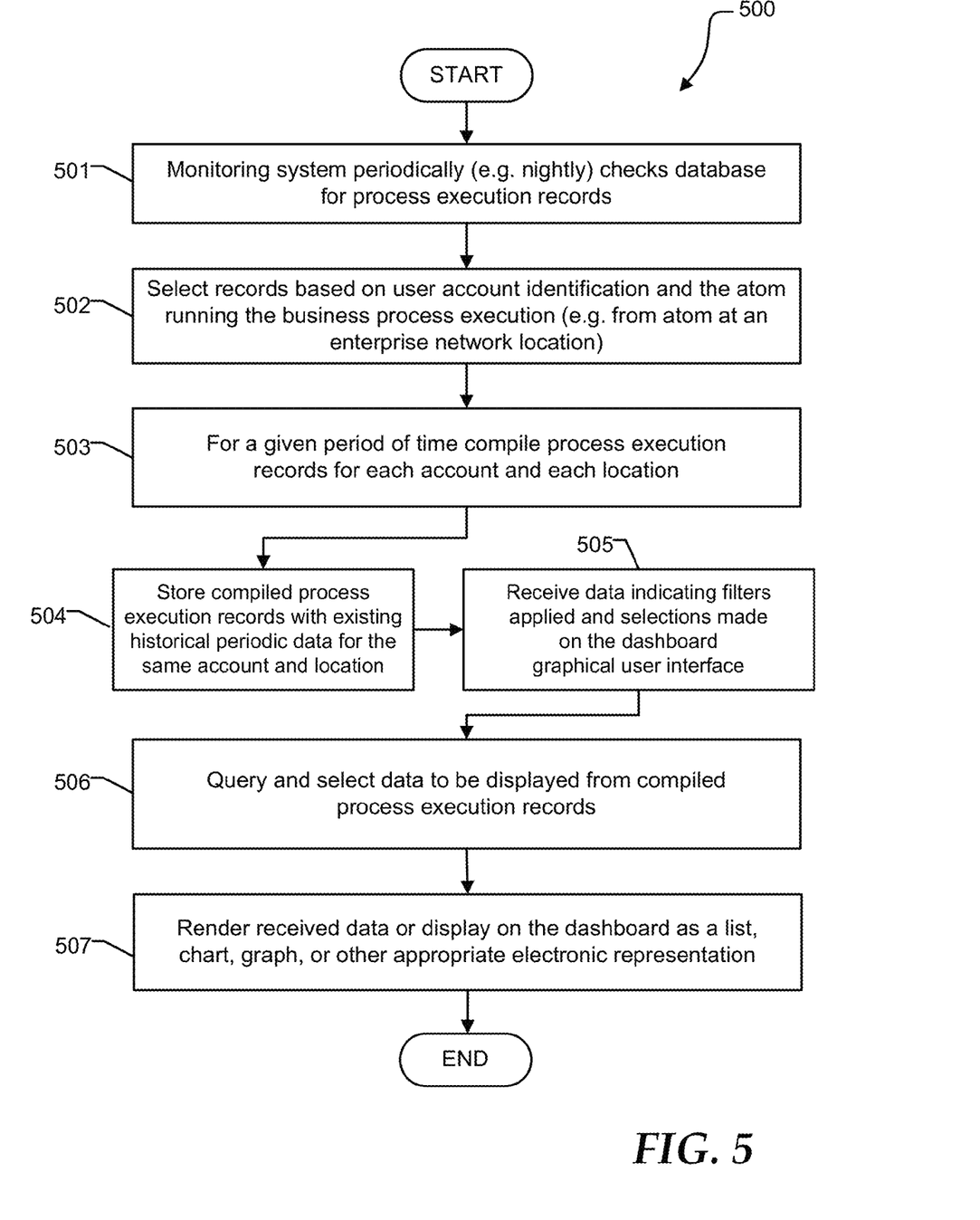
FIG. 5 is a flow diagram illustrating another method according to an embodiment of the present disclosure.

FIG. 5 shows a method 500 in accordance with an embodiment of the present disclosure. The method 500 shows how a database containing business process execution directory can be accessed by the monitoring system to create a business process execution table. The table, or other optional file format, is subsequently queried by the hierarchical dashboard to render the data therein. In this example embodiment, the business process execution directory is stored in a database located with the service provider 80. Other storage locations are contemplated including a database maintained within the enterprise network 90 instead of or in addition to a database at the service provider 80. The flow begins at block 501 where the monitoring system periodically checks the Service Provider system database for process execution records containing monitored data. In a preferred embodiment, this occurs nightly. Any other time period is contemplated, however.

The flow proceeds to block 502 where the monitoring system selects the monitored business process data for executed business processes based on an account identification and a given location identification. For example, an enterprise account using a customized executable system integration software application will execute a business process at one or more locations. The business process execution of a customized executable system integration software application at a given location for an account is sometimes referred to herein as an atom, for example in FIG. 3. However, a given location may have more than one business process run at the same location. In other words, several atoms may run business process executions at the same location. For example, one atom may run a test business process, while another at the same location may run a "live" operating business process. Data reported from an atom or an account location is selected by the monitoring system.

The flow proceeds to block 503 where the monitored business process data selected for the given time period, for example one day, is compiled in a table and stored in a database, such as the service provider database 80 of FIG. 1. At block 504, the flow associates the stored business process execution table for the current day with historical business process execution tables for the same account and location of the business process being monitored.

The flow proceeds to block 505 where the graphical user interface shown in FIG. 3 receives input applying filters and selections on views of data from the hierarchical dashboard. This assumes the viewer using the dashboard has security access rights to view the data requested. Such rights may be validated by known log in procedures using account name and password information. Other known security techniques my alternatively validate the access to the business process execution information.

Depending on the filters applied and the selections received from the dashboard interface shown in FIG. 3, the flow proceeds to block 506 where the monitoring system queries the historical business process execution tables for the identified account and location being requested. The query applies the received data filtering and viewing criteria. This results in a subset of data to be presented via the dashboard graphical user interface. The flow proceeds to block 507 whereby the monitoring system renders the data resulting from the query as a list 260, chart 250, graph 230, or other appropriate electronic representation as shown on the exemplary hierarchical dashboard of FIG. 2. In this way, the dashboard can provide a summary view of aggregate integration activity. The dashboard can highlight process errors and indicate the execution trends.

The dashboard interface is hierarchical in that specific displayed information may be viewed in further detail by clicking on a given element. For example, in the process errors list of 320 of FIG. 3, the load execution may be clicked to access the specific process containing errors. The process error message may be clicked to open dialog containing the entire message string. The process errors list may also be sorted by time, process, account, or error message. Similar features may be available to all monitored business process data displayed in the hierarchical dashboard. In another example, clicking on connector type identification in box 310 of FIG. 3 can indicate an account name or identification associated with the connector.

Figure 6:
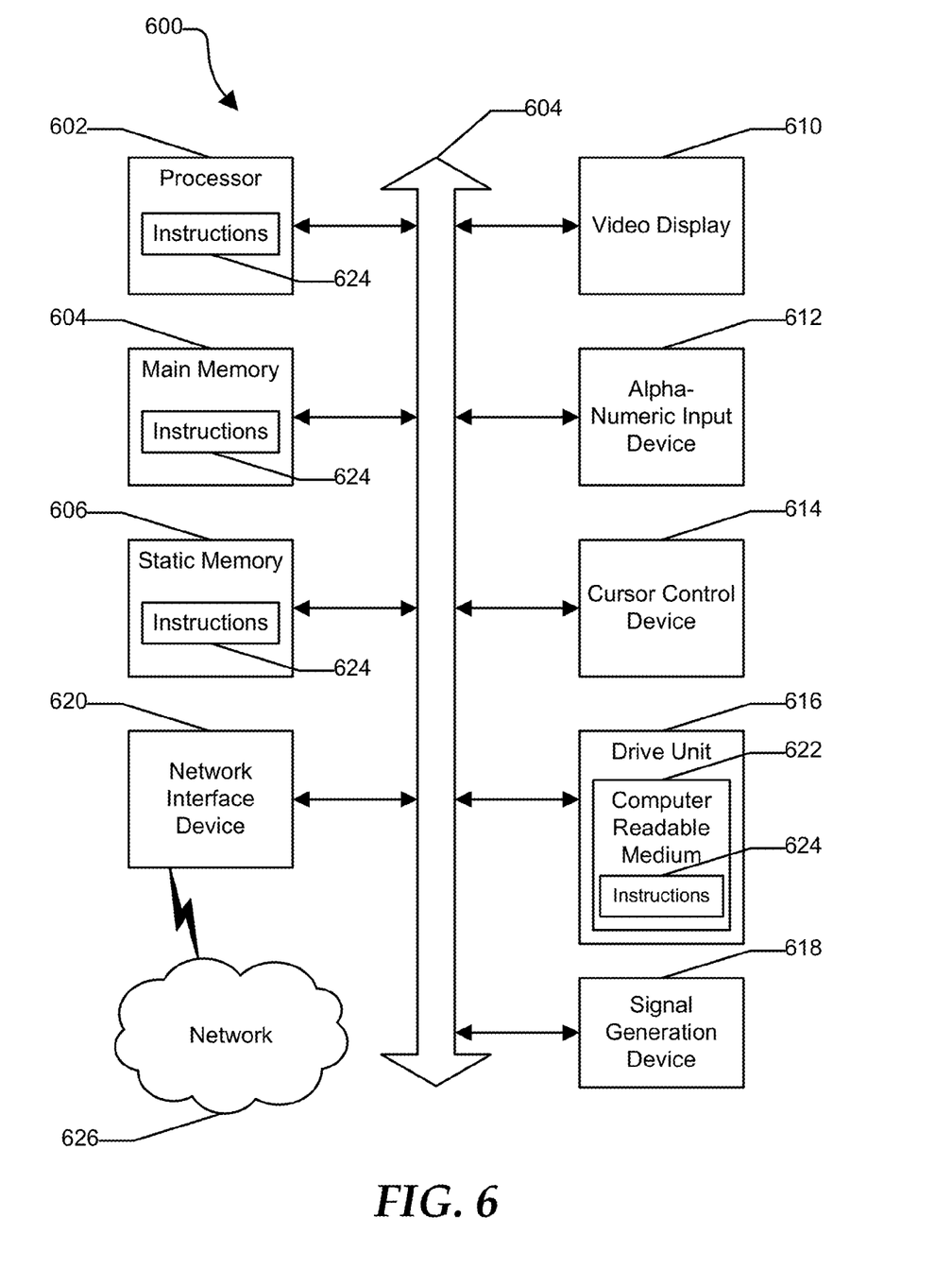
FIG. 6 illustrates a block diagram of an information handling system according to an embodiment of the present disclosure.

FIG. 6 shows an information handling system 600 capable of administering each of the specific embodiments of the present disclosure. The information handling system 600 can represent the user device 20, the systems 30, 60, 70, and 80 of FIG. 1, the monitoring system providing a hierarchical dashboard user display 200 of FIG. 2, or another data processing device associated with the business network system 10. The information handling system 600 may include a processor 602 such as a central processing unit (CPU), a graphics processing unit (GPU), or both. Moreover, the information handling system 600 can include a main memory 604 and a static memory 606 that can communicate with each other via a bus 608. As shown, the information handling system 600 may further include a video display unit 610, such as a liquid crystal display (LCD), an organic light emitting diode (OLED), a flat panel display, a solid state display, or a cathode ray tube (CRT). Additionally, the information handling system 600 may include an input device 612, such as a keyboard, and a cursor control device 614, such as a mouse. The information handling system 600 can also include a disk drive unit 616, a signal generation device 618, such as a speaker or remote control, and a network interface device 620. The information handling system 600 can represent a server device whose resources can be shared by multiple client devices, or it can represent an individual client device, such as a desktop personal computer.

The information handling system 600 can include a set of instructions that can be executed to cause the computer system to perform any one or more of the methods or computer based functions disclosed herein. The computer system 600 may operate as a standalone device or may be connected such as using a network, to other computer systems or peripheral devices.

In a networked deployment, the information handling system 1000 may operate in the capacity of a server or as a client user computer in a server-client user network environment, or as a peer computer system in a peer-to-peer (or distributed) network environment. The information handling system 600 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single information handling system 600 is illustrated, the term "system" shall also be taken to include any collection of systems or sub-systems that individually or jointly execute a set, or multiple sets, of instructions to perform one or more computer functions.

The disk drive unit 616 may include a computer-readable medium 622 in which one or more sets of instructions 624 such as software can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the information handling system 600. The main memory 604 and the processor 602 also may include computer-readable media. The network interface device 620 can provide connectivity to a network 626, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component or object distributed processing, and parallel processing. Alternatively, virtual computer system processing can be constructed to implement one or more of the methods or functionality as described herein.

The present disclosure contemplates a computer-readable medium that includes instructions 1124 or receives and executes instructions 1124 responsive to a propagated signal; so that a device connected to a network 1126 can communicate voice, video or data over the network 1126. Further, the instructions 1124 may be transmitted or received over the network 1126 via the network interface device 1120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A system for monitoring operation of executable system integration software application performance as part of an information handling system, the system for monitoring comprising:
    a connection via a network interface for receiving a plurality of executable system integration software application performance data types from an integrated business process event that conducts a transformation of documents between a first document format and a second document format to enable electronic data exchange between data formats using automatically-generated, customized executable system integration software application code having a plurality of integration code elements;
    a storage device for storing and aggregating the plurality of executable system integration software application performance data types for one or more integrated business process events being monitored;
    the processor receiving data representing elections made via a hierarchical dashboard graphical user interface to determine a scope of the at least one executable system integration software application performance data type to be viewed and generating the elected scope of executable system integration software application performance data;
    a display connected to the information handling system for receiving data representing the scope of at least one executable system integration software application performance data type elected to be rendered via a hierarchical dashboard graphical user interface;
    the processor associating one or more integrated business process events with a user account deploying the executable system integration software application;
    the processor updating the aggregated plurality of executable system integration software application performance data types affiliated with a user account;
    the processor periodically querying and receiving executable system integration software application performance data types;
    the processor rendering the plurality of executable system integration software application performance data types received as lists or plotted graphs in the hierarchical dashboard graphical user interface in real time; and
    the display displaying via the hierarchical dashboard graphical user interface a list of integrated business process event errors on a per account basis,
    wherein the plurality of executable system integration software application performance data types further comprises:
        at least one of a count of inbound documents, a count of outbound documents, or throughput levels of data passing through the integrated business process event for the transformation of documents;
        a count of integration code elements used;
        an identification of types of integration code elements used for transformation of documents between a first document format and a second document format;
        a number of integrated business process event errors recorded during transformation of documents between a first document format and a second document format for each integration code element having errors; and
        a status of the integrated business process event conducting the transformation.

2. The system of claim 1, wherein the plurality of executable system integration software application performance data types further comprises a count of outbound documents transformed by the integrated business process event.

3. The system of claim 1, wherein the information handling system storage device and display are located in a network separate from a location where the integrated business process event occurred.

4. The system of claim 1, wherein the information handling system storage device and display are located in a same network as a location where the integrated business process event occurred.

5. The system of claim 1, wherein the one or more processors receive data representing elections made via the hierarchical dashboard graphical user interface to determine the scope of one of the plurality of executable system integration software application performance data types to be viewed.

6. A method of monitoring operation of executable system integration software application performance for use with an information handling system, the method comprising:
- receiving at a database storage device a plurality of executable system integration software application performance data types from an integrated business process event that conducts the transformation of documents between a first document format and a second document format to enable electronic data exchange between data formats using automatically-generated, customized executable system integration software application code having a plurality of integration code elements;
- periodically, querying and receiving, via a processor, executable system integration software application performance data;
- aggregating in the database storage device the plurality of executable system integration software application performance data types for one or more integrated business process events being monitored;
- associating one or more integrated business process events with a user account deploying the executable system integration software application;
- updating executable system integration software application performance data affiliated with a user account;
- receiving data representing elections made via a hierarchical dashboard graphical user interface to determine a scope of at least one executable system integration software application performance data types to be viewed;
- according to the elections made, generating the scope of the executable system integration software application performance data of the type elected;
- rendering for display as lists or plotted graphs the plurality of executable system integration software application performance data types in the hierarchical dashboard graphical user interface in real time; and
- displaying via the hierarchical dashboard graphical user interface a list of integrated business process event errors on a per user account basis,
- wherein the plurality of executable system integration software application performance data types further comprises;
  - a count of integrated business process event errors recorded during the transformation of documents from the first document format to the second document format;
  - at least one of a count of inbound documents, a count of outbound documents, or throughput levels of data passing through the integrated business process event for the transformation of documents;
  - an identification of types of integration code elements used for transformation of documents between a first document format and a second document format; and
  - a status of the integrated business process event conducting the transformation.

7. The method of claim 6, wherein the plurality of executable system integration software application performance data types further comprises throughput levels of data passing through the integrated business process event for the transformation of documents.

8. The method of claim 6, further comprising receiving the plurality of executable system integration software application performance data types for the integrated business process event that occurred in a location that is separate from a network containing the database storage device.

9. The method of claim 6, further comprising receiving the plurality of executable system integration software application performance data types for the integrated business process event that occurred in a location that is the same as a network containing the database storage device.

10. The method of claim 6, further comprising displaying via the hierarchical dashboard graphical user interface a number of integrated business process event errors for that user account.

11. The method of claim 7, further comprising displaying via the hierarchical dashboard graphical user interface a histogram display of data representing data throughput levels for the integrated business process events for the user account.

12. The system of claim 1, wherein the plurality of executable system integration software application performance data further comprises a number of integrated business process event errors for each of the plurality of integration code elements.

13. A non-transitory computer readable medium comprising instructions to:
- periodically query a directory of a plurality of executable system integration software application performance data types in a database for a recently received executable system integration software application performance data for an integrated business process event that conducts the transformation of documents between a first document format and a second document format to enable electronic data exchange between data formats using automatically-generated, customized executable system integration software application code;
- update executable system integration software application performance data for an integrated business process affiliated with a user account deploying the executable system integration software application code, the update comprising adding recently received executable system integration software application performance data to aggregate executable system integration software application performance data stored in the database for an integrated business process;
- receive data representing elections made via a hierarchical dashboard graphical user interface to determine a scope of the at least one executable system integration software application performance data type to be viewed;
- according to the elections made, generate the scope of executable system integration software application performance data for the type selected and render for display as lists or plotted graphs the plurality of executable system integration software application performance data types in the hierarchical dashboard graphical user interface in real time; and
- display via the hierarchical dashboard graphical user interface a list of integrated business process event errors on a per user account basis,
- wherein the plurality of executable system integration software application performance data types further comprises:
  - at least one of a count of inbound documents, a count of outbound documents, or throughput levels of data passing through the integrated business process event for the transformation of documents;

an identification of types of integration code elements used for transformation of documents between a first document format and a second document format;

a number of integrated business process event errors recorded during the transformation of documents from the first document format to the second document format; and a status of the integrated business process event conducting the transformation.

14. The computer readable medium of claim 13, wherein the instructions further comprise instructions to generate the plurality of executable system integration software application performance data types further comprising a count of inbound documents for transformation into the second format by the integrated business process event.

15. The computer readable medium of claim 13, wherein the instructions further comprise instructions to generate the plurality of executable system integration software application performance data types further comprising a count of outbound documents transformed by the integrated business process event.

16. The computer readable medium of claim 13, wherein the instructions further comprise instructions to receive the plurality of executable system integration software application performance data types for the integrated business process event that occurred in a location that is separate from a network containing the database.

17. The computer readable medium of claim 13, wherein the instructions further comprise instructions to receive plurality of executable system integration software application performance data types for the integrated business process event that occurred in a location that is the same network containing the database.

18. The computer readable medium of claim 13, wherein the instructions further comprise instructions to display via the hierarchical dashboard graphical user interface a list of integrated business process event errors on a per user account basis and a number of integrated business process event errors for that user account.

19. The system of claim 1, further comprising the display displaying via the hierarchical dashboard graphical user interface a number of integrated business process event errors for the user account.

20. The computer readable medium of claim 13, wherein the instructions further comprise instructions to display via the hierarchical dashboard graphical user interface a number of integrated business process event errors for the user account.

* * * * *